(12) United States Patent
Kartalopoulos

(10) Patent No.: US 6,498,681 B2
(45) Date of Patent: Dec. 24, 2002

(54) APPARATUS AND METHOD FOR TEMPERATURE-COMPENSATING DIFFRACTION-BASED OPTICAL DEVICES

(75) Inventor: Stamatios V. Kartalopoulos, Annandale, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/848,135

(22) Filed: May 3, 2001

(65) Prior Publication Data

US 2002/0163724 A1 Nov. 7, 2002

(51) Int. Cl.[7] .............................. G02B 27/44; G02B 5/18
(52) U.S. Cl. .................. 359/566; 359/558; 250/227.14; 250/227.18
(58) Field of Search .................................. 359/565, 566, 359/558; 356/305, 328, 334; 250/238, 227.14, 227.18, 227.23

(56) References Cited

U.S. PATENT DOCUMENTS

| 4,620,093 | A | * | 10/1986 | Barkhoudarian et al. 250/231 P |
|---|---|---|---|---|
| 5,299,045 | A | * | 3/1994 | Sekiguchi ..................... 359/130 |
| 5,523,563 | A | * | 6/1996 | Moessner ..................... 250/238 |
| 6,301,031 | B2 | * | 10/2001 | Li ................................ 359/124 |
| 6,335,992 | B1 | * | 1/2002 | Bala et al. ..................... 385/17 |

* cited by examiner

Primary Examiner—Cassandra Spyrou
Assistant Examiner—Alessandro V. Amavi

(57) ABSTRACT

A temperature-compensated optical grating is fed an optical probe signal of a predetermined wavelength. An optical detector having a plurality of apertures for receiving an optical signal is positioned to detect a probe light signal from the grating and to detect the deflection of the probe light signal from a preferred location. The detector provides an indication of the deflection to a controller which operates a temperature adjustment device, such as a fan or thermoelectric cooler to adjust the temperature of the grating in a direction which reduces the deflection.

18 Claims, 6 Drawing Sheets

— 1 —
APPARATUS AND METHOD FOR TEMPERATURE-COMPENSATING DIFFRACTION-BASED OPTICAL DEVICES

CROSS-REFERENCE TO RELATED APPLICATIONS

An application entitled, "APPARATUS AND METHOD FOR OPTICAL PATTERN DETECTION" filed on the same date as this application having the same inventor and assigned to the same assignee as this application is hereby incorporated by reference.

FIELD OF THE INVENTION

The invention relates to diffraction gratings and, in particular, to the temperature-compensation of diffraction gratings.

BACKGROUND OF THE INVENTION

Diffraction gratings are passive optical devices that diffract a collimated light beam in specific directions according to various parameters, including the angle of incidence of the beam on the grating, the optical wavelength of the beam, the spacing of the lines that form the grating, and the blaze angle or Bragg angle of the grating. Although relatively simple devices, diffraction gratings find widespread and important application in various technologies. For example, in the communications industry, gratings are employed to divert optical signals in optical add/drop/multiplexers (OADMs) in optical crossconnects (OXCs), and other telecommunications components. Gratings redirect light within optical spectrum analyzers, in signal measurement and processing equipment, and in other signal measurement and processing equipment employed within the medical and biomedical fields.

The geometry of a diffraction grating is a function of its temperature, with the grating expanding and contracting with temperature variations. Additionally, a diffraction grating's thermoelectric properties change with temperature. Because these grating characteristics are critical to a grating's proper operation, temperature effects must be compensated for in order to insure the proper operation of the grating and the equipment which rely upon it.

One approach to compensating for the effects of the varying temperature of a grating is to employ a thermocouple in a closed loop control system. In such as system the thermocouple, attached to the grating's housing, senses temperature variations and provides feedback to a controller which operates a thermoelectric cooler or fan in response to the signal from the thermocouple. This approach is somewhat indirect, with no sensing of an actual temperature-dependent wavelength shift, which introduces the potential for misdirected or inadequate compensation. Additionally, there is an inherent lag built in to the system, since the thermocouple, attached to the grating housing, responds only after the housing reaches the temperature of the grating inside and the electronic control system requires additional time to respond to changes in the thermocouple. Such a system is also relatively complex, with the cost and reliability issues attendant to complexity.

Another approach to compensating for the deleterious effects of temperature variation on diffraction gratings involves attaching the gratings to substrates which have substantially equal and opposite thermal coefficients of expansion. See U.S. Pat. No. 5,694,503 to Fleming et. al., issued Dec. 2, 1997, which is hereby incorporated by reference. One of the disadvantages to this approach is that, again, it is somewhat indirect, with no sensing of an actual temperature-dependent wavelength shift. Additionally, this approach may require the use of somewhat exotic and expensive materials, and it is difficult to match materials with equal and opposite coefficients of thermal expansion, particularly since those coefficients may vary from lot to lot of the material.

An apparatus and method for diffraction grating temperature-compensation that employs a direct indication of a temperature-dependent wavelength shift would therefore be highly desirable.

SUMMARY

In accordance with the principles of the present invention a temperature-compensated optical grating is fed an optical probe signal of a predetermined wavelength. An optical detector is positioned substantially in the region to which the probe signal would be deflected at a calibrated or "zero" position. The optical detector is also positioned to determine the deflection of the probe signal from the zero position and to pass the deflection information along to a controller. The controller is configured to adjust a temperature adjustment device, such as a thermo-electric-cooler, to return the temperature of the grating to a preferred value associated with the calibrated, or zero, deflection value of the probe beam. The preferred temperature of the grating, and corresponding zero deflection value of the probe beam, may be, for example, at "room temperature".

Various optical components may advantageously employ a temperature-compensated diffraction grating in accordance with the principles of the present invention. For example, an optical crossconnect may employ such a diffraction grating to insure reliable operation in spite of temperature drifts. Similarly, an optical add/drop multiplexer may employ a temperature-compensated diffraction grating in accordance with the principles of the present invention in order to compensate for detected differences in deflection angle shifts due to temperature variations.

An array of photodetectors may be employed to provide a measure of a probe signal's temperature dependent deflection, or, alternatively, an integrated optical detector which requires as few as one photodetectors may be employed to provide feedback to the controller.

Although there a variety of diffraction gratings, for the clarity and convenience of description the present invention will be discussed generally in terms of a reflection grating. As will be recognized by those skilled in the art, the principles discussed herein may be applied to gratings other than reflection gratings.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
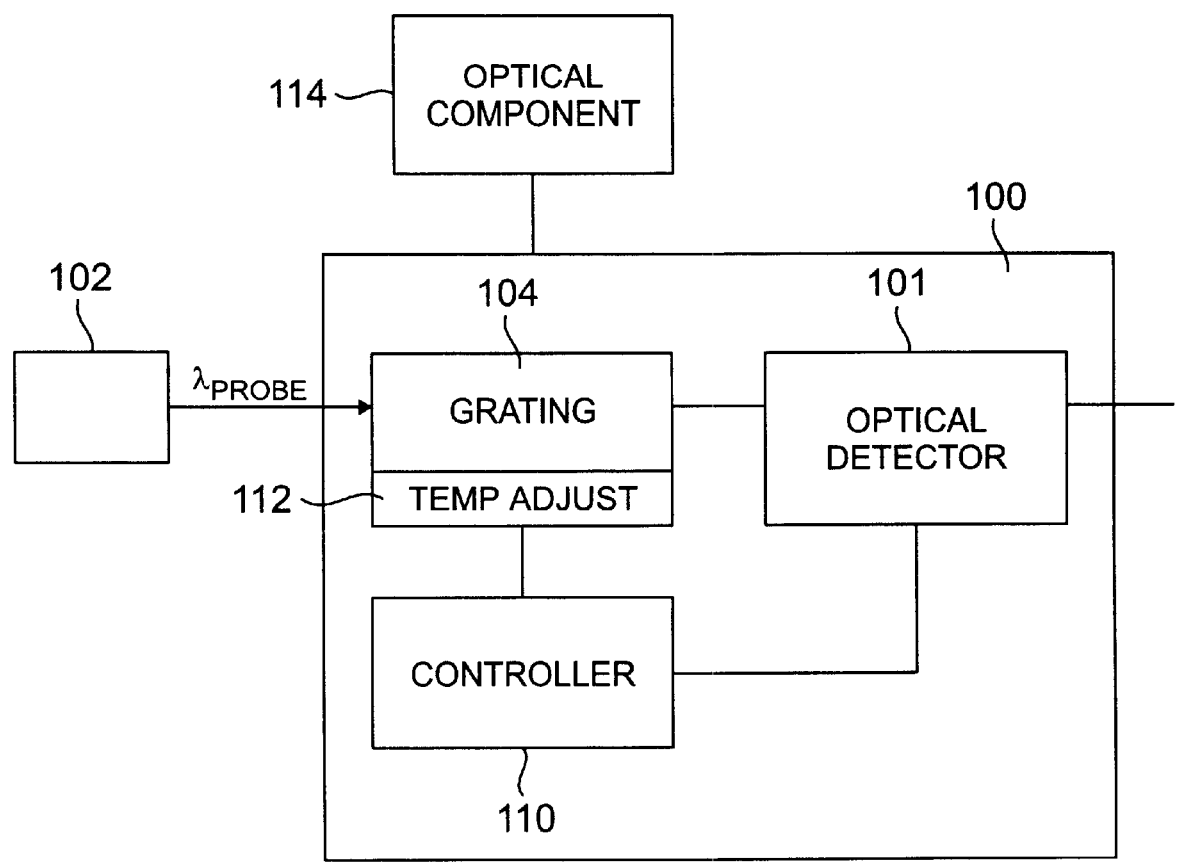
FIG. 1 is a conceptual block diagram of an optical-probe sensing temperature-compensated diffraction grating in accordance with the principles of the present invention operating in cooperation with other components to produce a temperature-compensated optical system.

The conceptual block diagram of FIG. 1 illustrates the components of a temperature-compensated diffraction grating 100 in accordance with the principles of the present invention. A probe signal source 102 transmits an optical probe signal $\lambda_{PROBE}$ having a predetermined probe frequency to a diffraction grating 104. The probe signal $\lambda_{PROBE}$ may be generated by a source 102 that is supplying working signals to the grating 104, the source 102 may be a part of a calibration system, or a separate optical signal source 102 may be employed solely for temperature compensation.

An optical detector 108 is positioned at a location where the probe signal $\lambda_{PROBE}$ would be deflected at a calibrated or "zero" position. The optical detector 108 is also positioned to determine the deflection of the probe signal from the zero position and to pass the deflection information along to a controller 110. The controller is configured to adjust a temperature adjustment device 112, such as a thermoelectric cooler, to return the temperature of the grating to a preferred value associated with the calibrated, or zero, deflection value of the probe beam. The preferred temperature of the grating, and corresponding zero deflection value of the probe beam, may be, for example, at "room temperature". In an illustrative embodiment, the temperature adjustment device 112 is a thermoelectric cooler directly attached to the body of the grating 104.

The temperature-compensated diffraction grating 100 may be employed in conjunction with various optical components 114. Two such uses, within an optical crossconnect (OXC) and within an optical add/drop multiplexer (OADM), will be described in greater detail in the discussion related to FIGS. 5 and 6.

Figure 2:
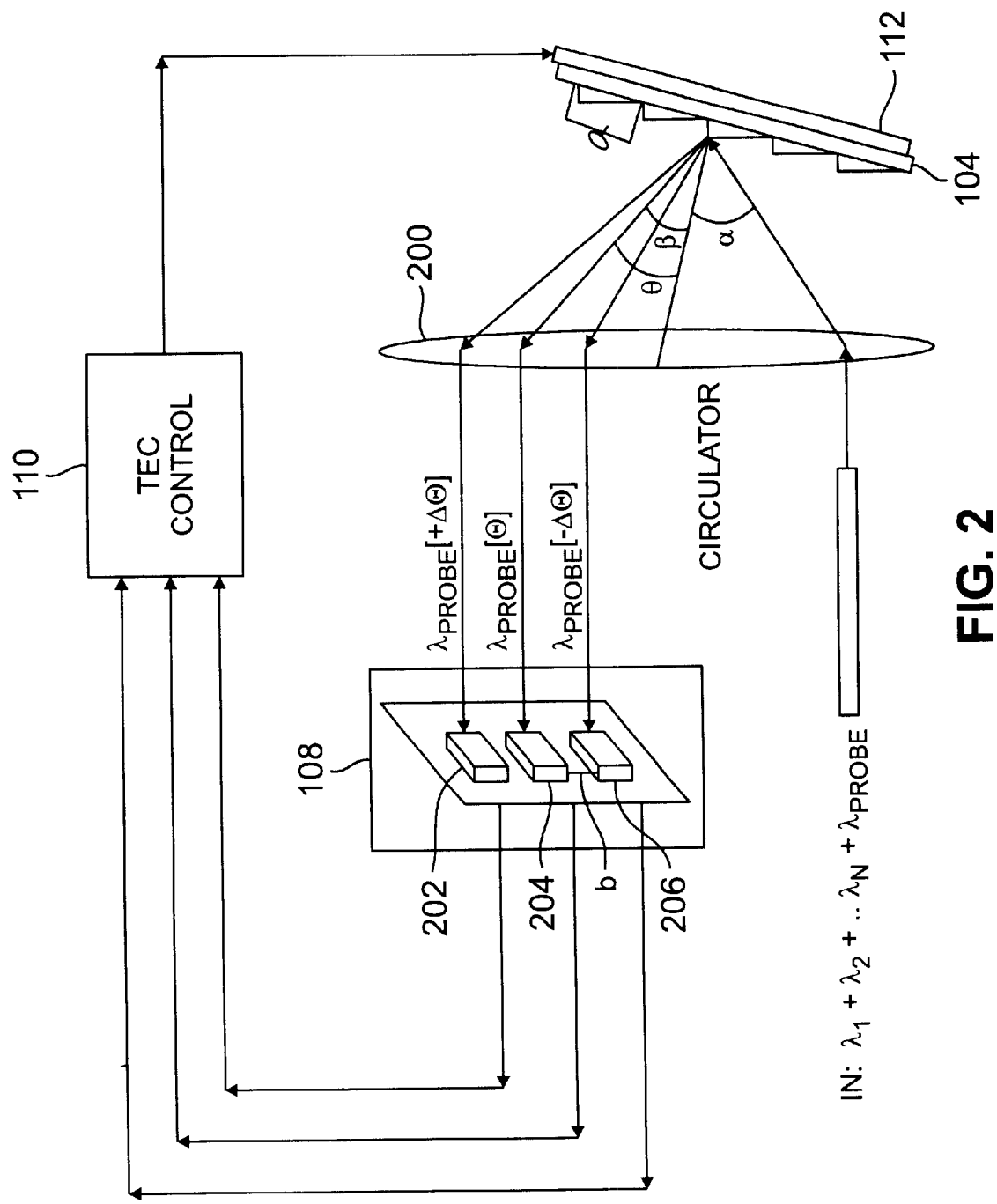
FIG. 2 is a conceptual schematic diagram of an optical-probe sensing temperature-compensated diffraction grating in accordance with the principles of the present invention which employs a plurality of photodetectors to determine the extent to which a probe beam is deflected due to a temperature variation in the grating.

The schematic diagram of FIG. 2 depicts in greater detail an illustrative embodiment of a temperature-compensated diffraction grating in accordance with the principles of the present invention in which a probe signal $\lambda_{PROBE}$ is supplied to a grating 104 through a lens 200. The grating 104 operates in this illustrative embodiment as an optical demultiplexer. In this illustrative embodiment the optical detector 108 includes an array of photodetectors 202, 204, 206 positioned to receive light from the probe signal at the probe signal's Bragg angle $\Theta_B$ and at greater $+\Delta\Theta_B$ and lesser $-\Delta\Theta_B$ angles, corresponding to expansions and contractions of the grating 104 due to temperature changes. Probe-related signals ($\lambda_{PROBE}\Theta_B$, $\lambda_{PROBE}+\Delta\Theta_B$, and $\lambda_{PROBE}-\Delta\Theta_B$) received at the detector 108 are fed to the controller 110 and used, as previously described, to adjust the temperature of the grating 104, through use of a thermoelectric cooler 112, for example. Signals related to wavelengths $\lambda_1$, $\lambda_2$, and $\lambda_N$ are passed to receivers, such as receiving fibers (not shown).

The blaze or Bragg angle $\Theta_B$, the wavelength $\lambda$, and the line spacing a are related by:

$$\Theta_B = 1/\sin(\lambda/2a) \qquad 1$$

The diffraction angle, $\beta$, is related to the incident angle, $\alpha$, and the wavelength, $\lambda$, by:

$$\sin\beta = \sin\alpha +/- (\lambda/n_0 a) \qquad 2$$

where $a = 2\pi/K$, K is the grating wave number.
For a fixed incident angle $\alpha$, the variation of $\lambda$, $\Delta\lambda$, with respect to the Bragg angle is:

$$\beta = \Theta_B + \Delta\lambda/(n_0 a \cos\Theta_B) \qquad 3$$

A temperature change in the grating 104 changes the grating spacing, a, due to thermal expansion/contraction and thereby produces an angular shift of wavelength, which may be described in terms of a fractional Bragg wavelength shift due to a temperature change T. This change is given by:

$$\Delta\lambda_o/\lambda_o = \zeta\Delta T \qquad 4$$

where $\zeta$ is the thermal expansion coefficient for the Bragg grating material (e.g., for silica is 0.55×10−6). In case of a fiber Bragg grating, the above is modified as:

$$\Delta\lambda_o/\lambda_o = (\zeta + \xi)\Delta T \qquad 5$$

where $\xi$ is the thermo-optic coefficient of the fiber Bragg grating (e.g., ~8.3×10−6 for germanium doped silica core).

The effect of the thermal expansion on the Bragg spacing is:

$$\Delta a = \zeta\Delta T \qquad 6$$

Thus, for a fixed $\lambda$, $\lambda_{FIXED}$, and fixed incident angle $\alpha$, the variation of $\beta$, $\Delta\beta$, with respect to the Bragg spacing a is:

$$\sin\beta = \sin\alpha +/- (\lambda_{FIXED}/n_0 a). \qquad 7$$

Applying a small perturbation one obtains:

$$\Delta\beta/\Delta T \cos\beta = +/- \Delta(\lambda/n_0 a)/\Delta T, \qquad 8$$

or $$[\Delta\beta/\Delta T]\cos\beta = +/- (\lambda/n_0)\Delta a/\Delta T \qquad 9$$

where the term $\Delta\alpha/\Delta T$ is eliminated as being independent of temperature. For very small angles of diffraction $\beta$, ($\cos\beta = 1$), the last relationship is simplified to:

$$\Delta\beta/\Delta T = +/- \zeta\lambda/n_0 \qquad 10$$

That is, the spatial distribution of wavelengths (or the angle of diffraction) largely depends on the Bragg grating temperature expansion coefficient. By varying the grating temperature the grating constant changes, and a spatial shift will take place for each of the wavelengths (signal and probe). As a result, the percentage of power associated with each of the signal wavelengths coupled into its corresponding receiving fiber (not shown) would be decreased, thus degrading the corresponding signals. However the same effect is employed by the detector 108 to sense the spatial shift due to temperature changes in the grating 104 and to adjust the temperature of the grating 104 accordingly, thereby substantially reducing or eliminating temperature-dependent signal degradations. The inter-detector spacing, b, may be determined using geometrical optics, taking into account the spatial shift just described and the distance from the grating to the detectors. That is, the detectors should be placed in close enough proximity so that the probe beam is deflected out of the central detector and into an off-axis detector (e.g., $\lambda_{PROBE}+\Delta\Theta_B$, or $\lambda_{PROBE}-\Delta\Theta_B$) before substantial losses occur in the signal receivers. Which of the neighboring photodetectors is activated is indicative of the direction of the temperature change (increase-decrease), and thus an appropriate corrective action may be taken. As previously noted, in accordance with the principles of the present invention, the sensing is a direct measure of the temperature-dependent spatial shift and, as such, any lag, or hysteresis associated with indirectly sensing the temperature change of the grating particularly, indirectly sensing it through a housing, is substantially eliminated.

Figure 3:
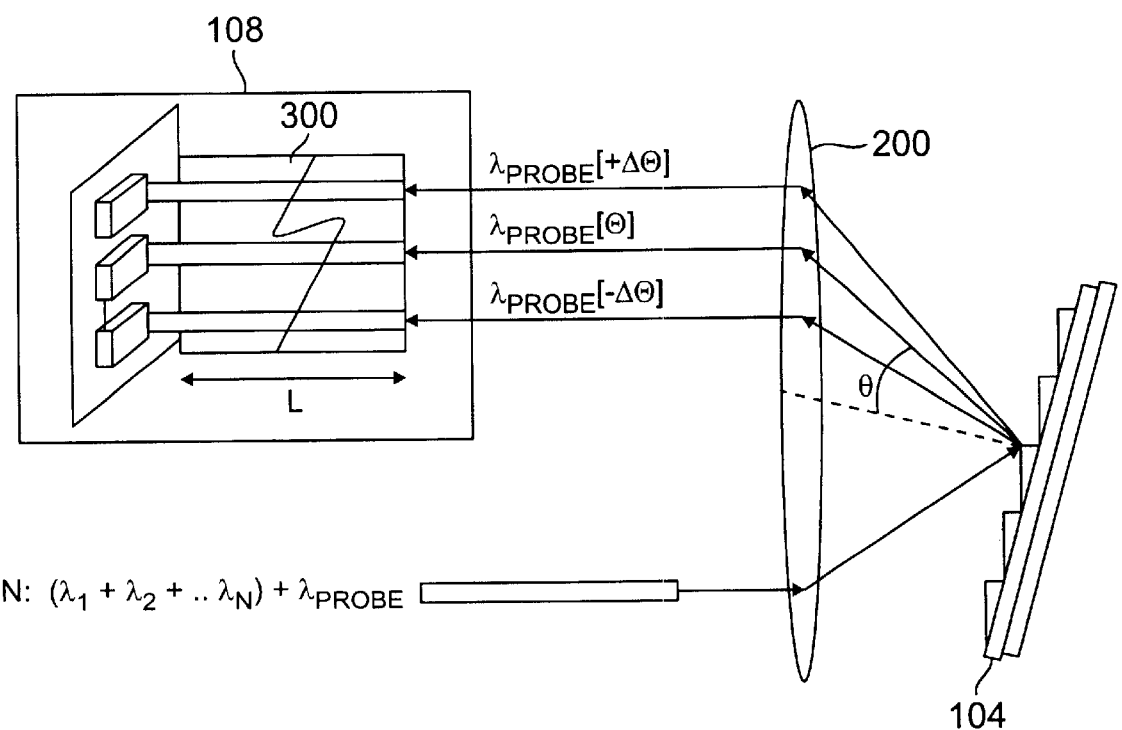
FIG. 3 is a conceptual schematic diagram of an optical-probe sensing temperature-compensated diffraction grating in accordance with the principles of the present invention which employs a plurality of optical fibers and one or more photodetectors to determine the extent to which a probe beam is deflected due to a temperature variation in the grating.

In the illustrative embodiment of FIG. 3 the detector 108 includes a plurality of optical fibers, illustratively packaged in a fiber ribbon 300 (other components of the temperature-compensation system illustrated in FIG. 2 are deleted from this figure for the sake of clarity). Employing optical fibers in this manner permits remote sensing of spatial shift due to temperature effects on the grating 104. Additionally, with the fibers within the ribbon monolithically integrated the inter-fiber spacing could be on the order of a few micrometers center-to-center. Such close spacing within the detector could improve the sensitivity of the detector 108 to temperature-dependent spatial shifts.

Figure 4:
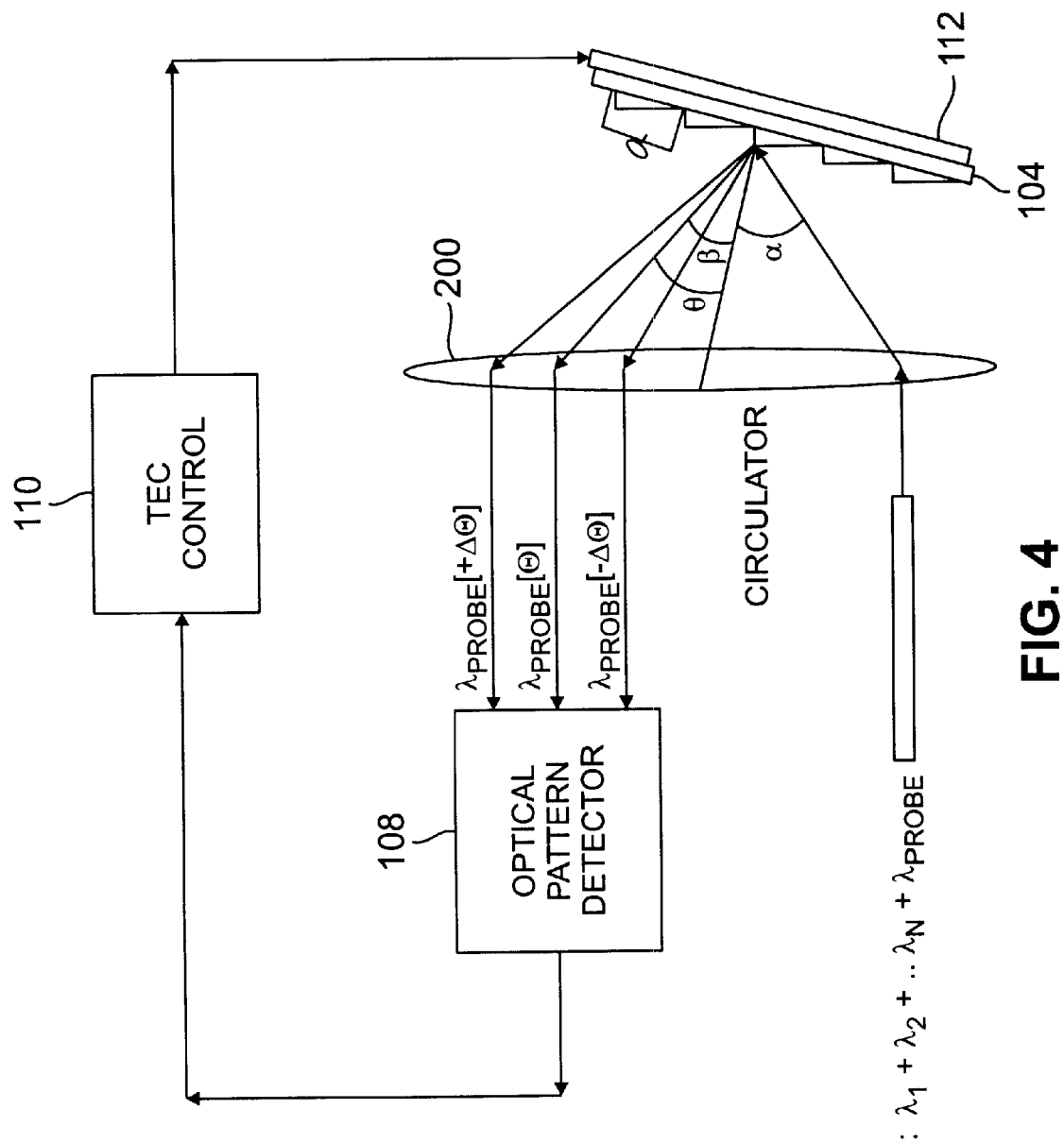
FIG. 4 is a conceptual schematic diagram of an optical-probe sensing temperature-compensated diffraction grating in accordance with the principles of the present invention which employs an optical pattern detector to determine the extent to which a probe beam is deflected due to a temperature variation in the grating.

Turning now to FIG. 4, an optical pattern detector, or a portion thereof, as disclosed in a co-filed patent application entitled, "APPARATUS AND METHOD FOR OPTICAL PATTERN DETECTION" filed on the same date as this application, having the same inventor and assigned to the same assignee as this application and which is incorporated by reference in this patent application, is used as the detector 108. The detector 108, may be arranged to detect optical patterns at a plurality of receivers, such as optical fiber inputs or integrated optical waveguide inputs. As described in the co-filed application, the pattern detector may take the form of a star coupler or its integrated optics equivalent. With different legs of the coupler given different weights, the detected optical pattern may be effectively converted from digital to analog form and the controller 110 may be configured to be responsive to the different patterns by employing different adjustment values to the temperature adjustment means 112 in a manner consistent with known control theory design.

Figure 5:
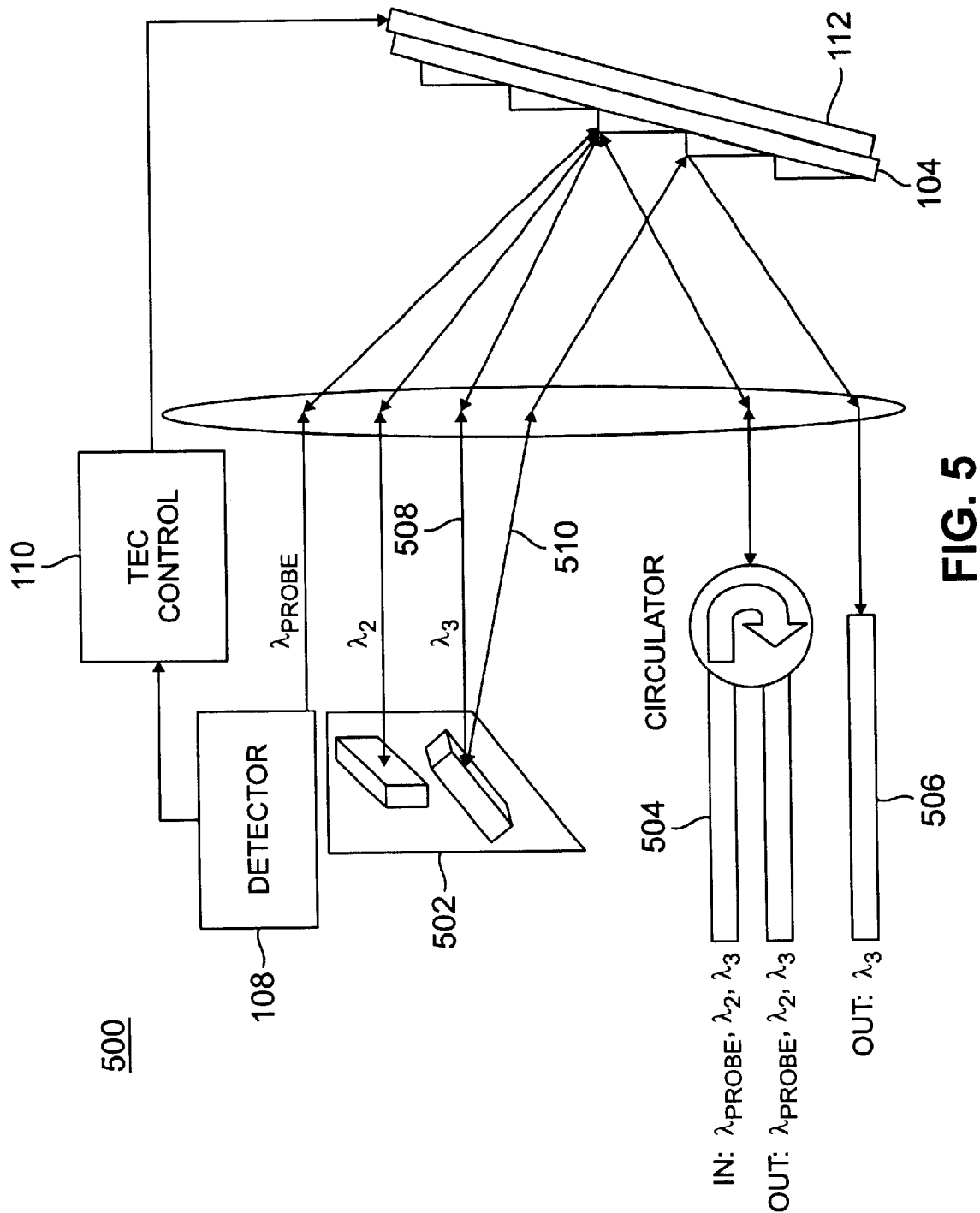
FIG. 5 is a conceptual schematic diagram of an optical crossconnect in accordance with the principles of the present invention which employs an optical-probe sensing temperature-compensated diffraction grating.

As portrayed by the conceptual schematic diagram of FIG. 5, an optical crossconnect in accordance with the principles of the present invention employs an architecture much like the demultiplexer of FIGS. 2 through 4. This illustrative embodiment, however, includes an optical switch 502 that operates to selectively switch from an incoming fiber 504 to an outgoing fiber 506. The switch 502 may include microelectromechanical mirrors, for example, which change the return angle of a signal, such as signal λ3 from an incoming path 508 to and outgoing path 510. A plurality of such switches may be combined to form an optical crossconnect. The detector 108, controller 110 and temperature control device 112 are as previously described.

Figure 6:
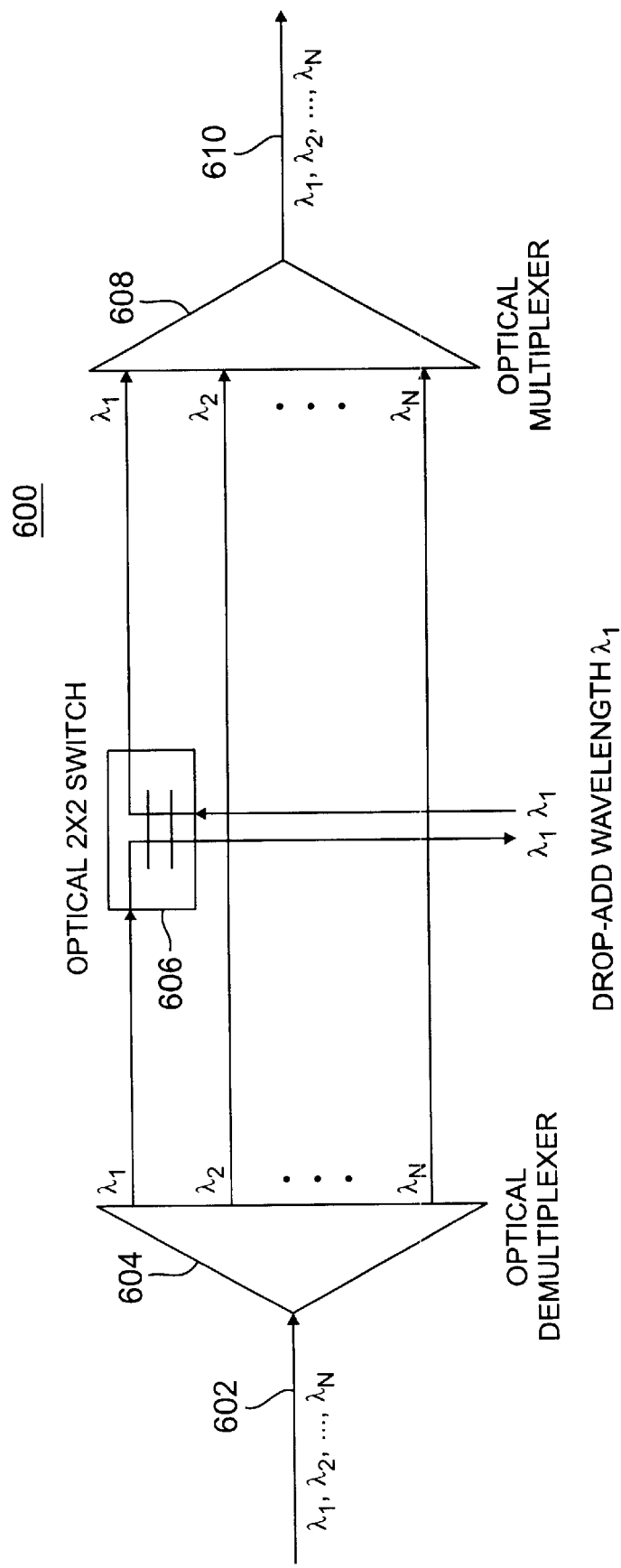
FIG. 6 is a conceptual schematic diagram of an optical add/drop multiplexer in accordance with the principles of the present invention which employs an optical-probe sensing temperature-compensated diffraction grating.

The Optical add/drop multiplexer 600 of FIG. 6 includes an input 602 for receiving a wavelength division multiplexed signal, with different communications channels assigned to different wavelengths of light, $\lambda_1, \lambda_2, \ldots \lambda_N$. The optical signals are fed to an optical demultiplexer 604 which "breaks out" the optical signals on the basis of wavelength. At least one optical 2×2 switch 606 is employed to switch signals of a predetermined wavelength, $\lambda_1$, in this illustrative example, out to and back in from a local "drop". Signals, including, $\lambda_1$, the signal picked up at the local drop, are then multiplexed at by the optical multiplexer for further transmission through output 610. Any of the components of the optical add/drop multiplexer 600 which employ a diffraction grating in their operation, such as demultiplexer 604 or optical switch 606, could advantageously use the temperature-compensated diffraction grating in accordance with the principles of the present invention described in the discussion related to the previous figures.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An temperature-compensated diffraction grating comprising:
   a diffraction grating;
   an optical detector having a plurality of apertures for receiving an optical signal, the detector positioned to detect a probe light signal of a predetermined wavelength from the grating and to detect a deflection of the probe light signal from a reference position;
   a controller configured to receive an indication of the deflection from the optical detector; and
   a temperature adjustment device operated by the controller in response to the indication of deflection to adjust the temperature of the diffraction grating by an amount that compensates for the deflection.

2. The temperature-compensated diffraction grating of claim 1 wherein the detector comprises an array of photodetectors.

3. The temperature-compensated diffraction grating of claim 2 wherein the detector comprises an array of optical fibers positioned to couple light to the photodetectors.

4. The temperature-compensated diffraction grating of claim 3 wherein the optical fibers are combined in an optical fiber ribbon.

5. The temperature-compensated diffraction grating of claim 1 wherein the detector comprises an optical pattern detector.

6. The temperature-compensated diffraction grating of claim 5 wherein the optical pattern detector comprises:
   an optical sensor configured to receive and sense an optical signal from at least two input apertures; and
   an optical summer configured to receive and sum the sensed optical signal from the at least two input apertures, the controller further configured to sample the summed optical signals.

7. The temperature-compensated diffraction grating of claim 1 wherein the temperature adjustment device comprises a fan.

8. The temperature-compensated diffraction grating of claim 1 wherein the temperature adjustment device comprises a thermoelectric cooler.

9. A temperature-compensated optical demultiplexer comprising:
- an input for receiving a multi-wavelength optical signal;
- a plurality of outputs for transmitting a plurality of single-wavelength optical signals; and
- a temperature-compensated diffraction grating positioned to receive the multi-wavelength optical signal, to demultiplex the multi-wavelength signal into discrete single-wavelength optical signals and to transmit the single-wavelength optical signals to the plurality of outputs, the temperature-compensated diffraction grating including a diffraction grating;
    - an optical detector having a plurality of apertures for receiving a probe light signal of a predetermined wavelength, the detector positioned to detect the probe light signal of a predetermined wavelength from the grating and to detect the deflection of the probe light signal from a reference position;
    - a controller configured to receive an indication of the deflection from the optical detector; and
    - a temperature adjustment device operated by the controller in response to the indication of deflection to adjust the temperature of the diffraction grating by an amount that compensates for the deflection.

10. A temperature-compensated optical switch comprising
- an input for receiving a multi-wavelength optical signal;
- a plurality of outputs for transmitting a plurality of single wavelength optical signals;
- a temperature-compensated diffraction grating positioned to receive the multi-wavelength optical signal, to demultiplex the multi-wavelength signal into discrete single-wavelength optical signals and to transmit the single-wavelength optical signals to a microelectromechanical device which controllably deflects the single-wavelength optical signals to the plurality of outputs, the temperature-compensated diffraction grating including a diffraction grating;
    - an optical detector having a plurality of apertures for receiving a probe light signal of a predetermined wavelength, the detector positioned to detect the probe light signal of a predetermined wavelength from the grating and to detect the deflection of the probe light signal from a reference position;
    - a controller configured to receive an indication of the deflection from the optical detector; and
    - a temperature adjustment device operated by the controller in response to the indication of deflection to adjust the temperature of the diffraction grating by an amount that compensates for the deflection.

11. A temperature-compensated optical add/drop multiplexer comprising:
- a temperature-compensated optical demultiplexer configured to receive a multi-wavelength optical signal and to demultiplex the multi-wavelength optical signal into discrete single-wavelength signals, said temperature-compensated optical demultiplexer including:
    - an input for receiving a multi-wavelength optical signal;
    - a plurality of outputs for transmitting a plurality of single-wavelength optical signals; and
    - a temperature-compensated diffraction grating positioned to receive the multi-wavelength optical signal, to demultiplex the multi-wavelength signal into discrete single-wavelength optical signals and to transmit the single-wavelength optical signals to the plurality of outputs, the temperature-compensated diffraction grating including:
        - a diffraction grating;
        - an optical detector having a plurality of apertures for receiving a probe light signal of a predetermined wavelength, the detector positioned to detect the probe light signal of a predetermined wavelength from the grating and to detect the deflection of the probe light signal from a reference position;
        - a controller configured to receive an indication of the deflection from the optical detector; and
        - a temperature adjustment device operated by the controller in response to the indication of deflection to adjust the temperature of the diffraction grating by an amount that compensates for the deflection; and
- at least one 2×2 optical switch configured to receive a discrete single-wavelength signal from the demultiplexer at one port, to switch the signal to a drop output at another port, to receive a returned signal of the same wavelength at another port, and to pass the returned signal to an optical multiplexer.

12. A method of compensating temperature-dependent effects on a diffraction grating comprising the steps of:
(A) transmitting a probe light signal of a predetermined wavelength to a diffraction grating;
(B) detecting the deflection of the probe light signal from a reference position; and
(C) controlling the temperature of the diffraction grating in response to the detection of step(B).

13. The method of claim 12 wherein the detecting of step (B) comprises the step of:
(B1) detecting the deflection with an array of photodetectors.

14. The method of claim 13 wherein the detecting of step (B1) comprises the step of:
(B2) coupling light to the photodetectors through optical fibers.

15. The method of claim 13 wherein the detecting of step (B1) comprises the step of:
(B3) coupling light to the photodetectors through an optical fiber ribbon.

16. The method of claim 12 wherein the detecting of step(B) comprises the step of:
(B4) detecting the deflection with an optical pattern detector.

17. The method of claim 16 wherein the detecting of step (B4) comprises the steps of:
(B5) receiving and sensing an optical signal from at least two input apertures; and
receiving and summing the sensed optical signal from the at least two input apertures.

18. The method of claim 12 wherein controlling the temperature in step (C) comprises the step of:
(C1) controlling a thermoelectric cooler attached to the diffraction grating.

* * * * *